United States Patent
Nishimura et al.

(10) Patent No.: US 6,795,385 B2
(45) Date of Patent: Sep. 21, 2004

(54) OPTICAL DISK RECORDING AND REPRODUCING APPARATUS AND METHOD FOR RECORDING AND CONTROLLING OPTICAL DISK

(75) Inventors: Tomoe Nishimura, Yokohama (JP); Akira Hikimura, Yokohama (JP); Kunihiko Kodama, Yokohama (JP); Katsutoshi Moriyama, Zushi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 617 days.

(21) Appl. No.: 09/930,467

(22) Filed: Aug. 16, 2001

(65) Prior Publication Data

US 2002/0024901 A1 Feb. 28, 2002

(30) Foreign Application Priority Data

Aug. 17, 2000 (JP) ........................................ 2000-247701

(51) Int. Cl.[7] ................................................. G11B 5/09
(52) U.S. Cl. ................................. 369/47.33; 369/53.31
(58) Field of Search ........................... 369/47.19, 47.21, 369/47.29, 47.3, 47.32, 47.33, 47.34, 47.55, 53.37, 53.45, 53.31, 124.04, 124.07, 124.08

(56) References Cited

U.S. PATENT DOCUMENTS 6,445,657 B2 * 9/2002 Koudo et al. ............ 369/47.34
6,570,832 B2 * 5/2003 Yamamoto ................ 369/59.25
6,661,755 B2 * 12/2003 Yamamoto ................ 369/47.33

FOREIGN PATENT DOCUMENTS

JP        2000-40302        2/2000

* cited by examiner

Primary Examiner—Paul W. Huber
(74) Attorney, Agent, or Firm—Oblon, Spivak, McClelland, Maier & Neustadt, P.C.

(57) ABSTRACT

An optical disk recording and reproducing apparatus comprise, a buffer circuit which receive and store data and output the stored data, an EFM modulation circuit which receive data output from the buffer circuit, adding a frame synchronous signal and sub-code data, subjecting these items of data to the EFM modulation to create record data, a buffer remaining amount control circuit for detecting the remaining amount of data stored in the buffer circuit, a record control circuit for conducting the control for temporarily suspending the recording operation to the optical disk at an arbitrary position of the main data of the record data excluding the frame synchronous signal and the sub-code data in the case where the detection result of the remaining amount of data in the buffer remaining amount control circuit corresponds to the state in which the buffer underrun is generated.

11 Claims, 4 Drawing Sheets

OPTICAL DISK RECORDING AND REPRODUCING APPARATUS AND METHOD FOR RECORDING AND CONTROLLING OPTICAL DISK

BACKGROUND OF THE INVENTION

1. Field of the Invention

The present invention relates to an optical disk recording and reproducing apparatus using a write-once type optical disk as a recording medium and a method for recording and controlling an optical disk.

2. Description of the Related Art

As an optical disk which is capable of recording data, a write-once type optical disk is known which uses an organic pigment in a recording layer thereof. As such write-once type optical disk, there is available a CD-R (recordable) or the like.

In order to record data with respect to the write-once type optical disk, for example, data to be written which is output, for example, from a personal computer or the like is temporarily stored in a buffer circuit. Then, data stored in the buffer circuit is subsequently read, and a synchronous signal, sub-code data, an error correction code or the like is added, and the EFM (Eight to Fourteen Modulation) conversion is conducted. Furthermore, after converting data to a record pulse signal, data is recorded by supplying data with the laser pickup.

In a write-once type optical disk such as a CD-R or the like, a buffer underrun state is generated in which the data transmission rate of the input data is delayed at the time of supplying data to the buffer circuit as compared with the data transmission rate at the time of recording data on the disk. When the buffer underrun state is generated, the record data is interrupted and the buffer underrun is generated. Optical disks such as disk-at-once type disks and track-at-once disks in which file groups to be written are designated in advance cannot be used any more, and such disks must be discarded.

Jpn. Pat. Appln. KOKAI Publication No. 2000-4030 describes a technique for restarting from the front of non-recorded area an operation of writing data which continues to data which is written immediately before interruption at the time when the data writing operation to the disk is suspended and the remaining amount of data of the buffer circuit becomes sufficient upon the detection of the fact that the remaining amount of data in the buffer circuit becomes small.

BRIEF SUMMARY OF THE INVENTION

An optical disk recording and reproducing apparatus according to an aspect of the present invention comprises:

a buffer circuit configured to receive and store data input via an interface and output the stored data;

an EFM modulation circuit connected to the buffer circuit for receiving data output from the buffer circuit, adding at least a frame synchronous signal and sub-code data with respect to the data, subjecting these items of data to the EFM modulation to create record data to be recorded on an optical disk;

a buffer remaining amount control circuit connected to the interface and the EFM modulation circuit for detecting the remaining amount of data stored in the buffer circuit;

a record control circuit connected to the EFM modulation circuit and the buffer remaining amount control circuit for conducting the control for temporarily suspending the recording operation with respect to the optical disk at an arbitrary position of the main data of the record data excluding the frame synchronous signal and the sub-code data in the case where the detection result of the remaining amount of data in the buffer remaining amount control circuit corresponds to the state in which a data transmission rate of an input data to the buffer circuit is lower than a data transmission rate of an output data from the buffer circuit to the EFM modulation circuit at a time of recording data on the optical disk; and a record restarting position detection circuit connected to the record control circuit for receiving data obtained by reproducing the optical disk on which the recording operation is temporarily suspended in the midst of recording the record data and detecting the position of the disk on which the recording operation is temporarily suspended;

wherein the record control circuit conducts a control for restarting a recording operation with respect to the optical disk from the record restarting position on the disk detected with the record restarting position detection circuit in the case where the detection result of the remaining amount of data in the buffer remaining amount detection circuit corresponds to the state in which the data transmission rate of the input data to the buffer circuit is higher than the data transmission rate of the output data from the buffer circuit to the EFM modulation circuit.

A method for recording and controlling an optical disk according to another aspect of the present invention comprises:

storing input data in a buffer circuit and outputting the stored data from the buffer circuit;

adding at least a frame synchronous signal and sub-code data to data output from the buffer circuit and further subjecting data to the EFM modulation to create record data which is to be recorded on an optical disk;

judging the remaining amount of data stored in the buffer circuit for temporarily suspending the recording operation with respect to the optical disk at an arbitrary position of the main data of the record data excluding the frame synchronous signal and the sub-code data in the case where the remaining amount of data provides a state in which a data transmission rate of the input data to the buffer circuit is lower than the output data from the buffer circuit;

detecting the position of the disk on which the recording operation is temporarily suspended by the reproduction of the optical disk in the case where the state in which the data transmission rate of the input data to the buffer circuit is higher than the output data from the buffer circuit; and restarting the recording operation of new record data so that the new data continues to the end of the record data on the optical disk which data is generated in the temporary suspension.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, referring to the drawings, there will be explained an optical disk recording and reproducing apparatus and a method for recording and controlling an optical disk by taking as an example a case in which the optical disk recording and reproducing apparatus and a method for recording and controlling the optical disk are applied to a CD-R recording and reproducing apparatus and a recording and controlling method thereof.

In the beginning, a general data structure of the CD format will be explained.

Figure 1:
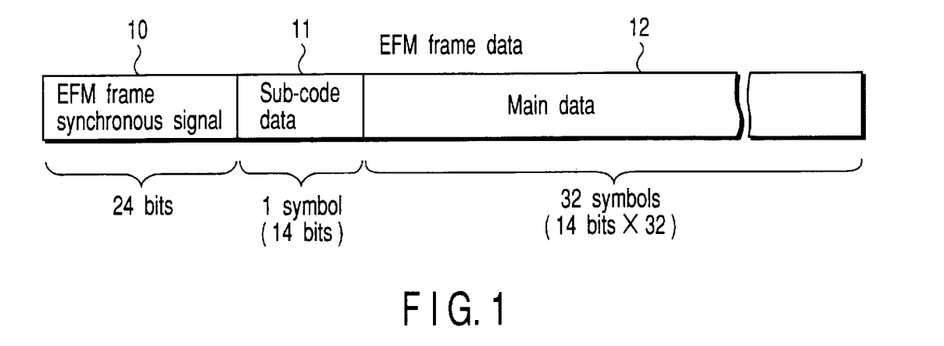
FIG. 1 is a view showing a data structure for one frame of a CD format.

FIG. 1 is a view showing a data structure (EFM frame data) for one frame of the CD format. The EFM frame data comprises a 24-bit synchronous signal (EFM synchronous signal) 10, one symbol (14 bits) sub-code data (sub-codec) 11, and 32 symbol (14 bits×32 symbols) main data 12.

The EFM frame synchronous signal 10 is used for detecting the front of the main data 12 of the 32 symbols which follows after that. The sub-code data 11 is used for the purpose of providing a program function which is reproduced in an order which is set in advance. Incidentally, three data items are respectively added to the EFM frame synchronous signal 10 for connecting each of the symbols in addition to the EFM frame synchronous signal 10, the sub-code data 11, and the main data 12. Here, drawings thereof are omitted.

Figure 2:
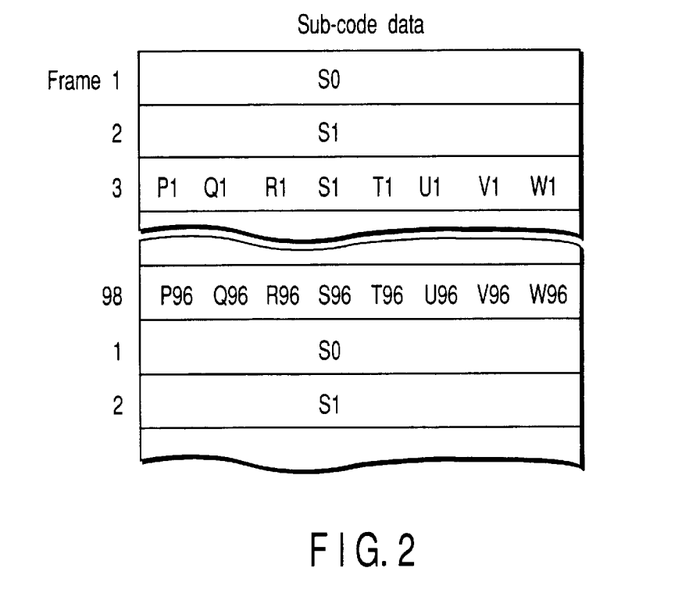
FIG. 2 is a view showing a data structure of a sub-code block.

One item of the sub-code data 11 is provided on one frame, and one block is formed with 98 items of sub-code data provided on 98 frames. This one block is referred to as a sub-code block. FIG. 2 is a view showing the data structure thereof. In the sub-code data block, the synchronous signal for identifying the front of the block is required. In FIG. 2, a synchronous pattern comprising S0 and S1 included in the sub-code data of the first frame and S1 included in the sub-code data of the second frame corresponds to this (a synchronous signal for identifying the front of the block). The sub-code data of the first frame and the second frame comprises the S0 and the S1. The remaining 96 frame sub-code data comprises eight (eight before the EFM modulation) bit data comprising Pi, Qi, Ri, Si, Ti, Ui, Vi and Wi (i=1 through 96). Each bit data of these Pi through Wi is used for various accesses.

Figure 3:
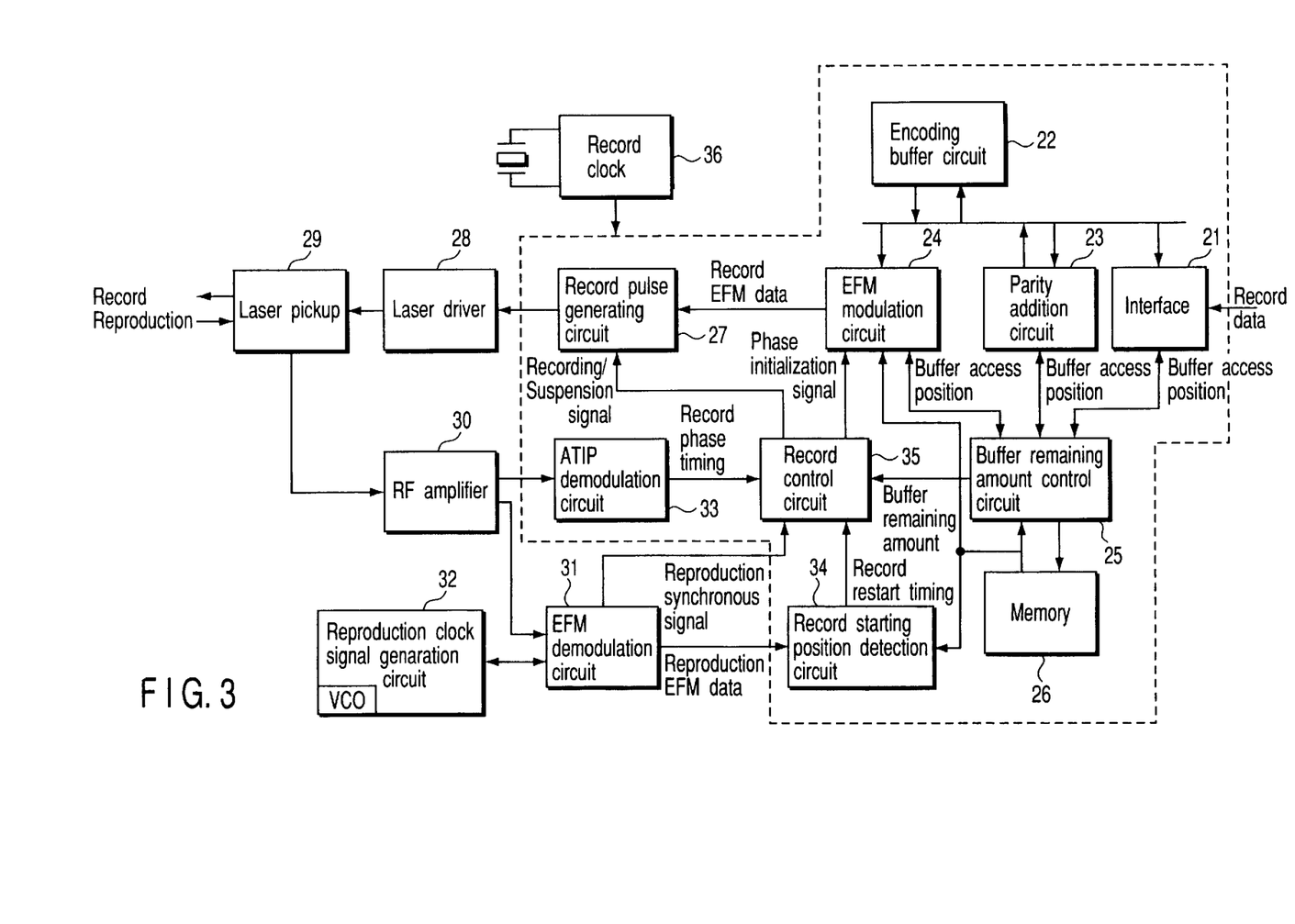
FIG. 3 is a block diagram showing an overall circuit structure of a CD-R recording and reproducing apparatus according to one embodiment of the present invention.

An overall structure of the CD-R recording and reproducing apparatus according to one embodiment of the present invention is shown in a block diagram of FIG. 3.

To the interface 21, record data output, for example, from the personal computer is supplied. The record data supplied to the interface 21 is supplied to the encoding buffer circuit 22 and is temporarily stored. The data stored in the encoding buffer circuit 22 is subsequently read and is supplied to the parity addition circuit 23. The parity addition circuit 23 creates and adds parity data with respect to the data stored in the buffer circuit 22. The data to which the parity data is added is again sent to the encoding buffer circuit 22 and is stored therein.

Furthermore, data to which the parity data is added is read from the buffer circuit 22 and is supplied to the EFM modulation circuit 24. The EFM modulation circuit 24 modulates the data read from the buffer circuit 22 to create EFM data which is to be stored on the disk. In the case where the EFM modulation circuit 24 conducts modulation on the basis of the CD-ROM standard, a sink, a header, data such as EDC (Error Detection Code) of the error detection code for CD-ROM data and ECC (Error Correction Code) of the error correction code are added and CIRC (abbreviation for Cross Interleaved Reed-Solomon Code) processing which is a CD method error correction code is conducted, a sub-code is added, and the EFM (Eight to Fourteen Modulation) is conducted. Furthermore, the frame synchronous signal is added, and record data is created.

The buffer remaining amount control circuit 25 detects the access position in the buffer circuit 22 when the parity addition circuit 23 and the EFM modulation circuit 24 respectively access the buffer circuit 22 and detects the remaining amount of the buffer circuit 22. That is, in the beginning, the access position of the buffer circuit 22 by the interface 21, the parity addition circuit 23, and the EFM modulation circuit 24 is stored in the memory 26 as address information. Then, the contents of the memory 26 are read to the buffer remaining amount control circuit 25 when needed, and the remaining amount of data stored in the buffer circuit 22 is monitored in the sub-code block unit based on the data information from the memory 26. Then, the buffer remaining amount control circuit 25 judges that the state in which the buffer underrun is generated in which the data transmission rate of the input data to the buffer circuit 22 is lower than the data transmission rate at the time of recording data on the disk and the state in which the buffer underrun is generated are avoided.

Here, for example, the buffer remaining amount control circuit 25 reads from the memory 26 the address information of the record data finally supplied to the buffer circuit 22 via the interface 21 and the address information of the record data finally read with respect to the EFM modulation circuit 24 from the buffer circuit 22 and compares the two addresses with the result that the circuit 25 detects the remaining amount of data in the buffer circuit 22 to judge whether or not the state in which the buffer underrun is generated can be avoided.

The record pulse generating circuit 27 creates a record pulse signal on the basis of the recorded EFM data created in the EFM modulation circuit 24. The created record pulse signal is sent to the laser driver 28. The laser driver 28 drives a light source of the laser pickup 29 for recording data on the disk on the basis of the record pulse signal created at the record pulse generating circuit 27.

The laser pickup 29 emits laser beams for tracing the disk to write record data on the disk or read data from the disk.

The RF amplifier 30 amplifies the RF signal obtained by reading the record data of the disk with the laser pickup 29 to converts the signal into a binary value to output the signal as digital data. The EFM modulation circuit 31 demodulates the digital data output from the RF amplifier 30 to output the reproduced EFM data while a reproduction synchronous signal comprising the EFM synchronous signal and synchronous signals S0 and S1 in the sub-code is detected.

The reproduction clock signal generation circuit 32 has a VCO (voltage controlled oscillator) and a reproduction clock signal is generated which is used for the control of the system of the whole operation associated with the reproduction of the disk on the basis of the clock signal with which the EFM data is reproduced.

The ATIP demodulation circuit 33 extracts wobble components from a Pre-groove signal of the disk obtained via the RF amplifier 30 to create components required for the rotation control of the disk while the ATIP (Absolute Time In Pre-groove) is demodulated from the wobble components.

The record starting position detection circuit 34 receives the reproduction EFM data output from the EFM demodulation circuit 31 and address information read from the memory 26 to detect the front of the non-recorded area in which no data is recorded on the disk and detect the record starting position for the start of recording of the record data on the disk to output the record restart timing signal.

The record control circuit 35 receives data in accordance with the buffer remaining amount from the buffer remaining amount control circuit 25, a reproduction synchronous signal from the EFM modulation circuit 31, a record restart timing signal from the ATIP demodulation circuit 33, and the record restart timing signal from the record starting position detection circuit 34 to conduct an operation of initializing an operation of the FFM modulation circuit 24 on the basis of these items of data and the signal while controlling the temporary suspension and the restarting operation of the creation of the record pulse signal in the record pulse generating circuit 27.

The record clock signal generating circuit 36 generates an operation clock signal which is used for the system control of the whole operation associated with the recording of the disk.

Incidentally, the address information read from the memory 26 is also supplied to the EFM modulation circuit 24.

In the optical disk recording and reproducing apparatus having such a structure, when the recording operation is started, the record clock signal generating circuit 36 generates a record clock signal. Each of the circuits in an area surrounded with broken lines in FIG. 3 is set in an operating state in synchronization with the clock signal for recording.

Furthermore, the laser pickup 29 is controlled to read Pre-groove signal of the disk with the laser output for conducting disk reproduction. After the read Pre-groove signal is rectified in the waveform with the RF amplifier 30, the wobble component is extracted with the ATIP demodulation circuit 33, so that the ATIP is demodulated from the wobble component.

Furthermore, the record data output for recording the data on the disk from the personal computer is supplied to the encoding buffer circuit 22 via the interface 21 while the data is read from the buffer circuit 22 to be modulated in the record EFM data form in which data is to be recorded with the EFM modulation circuit 24.

When the position which is traced with the laser beams of the laser pickup 29 comes to the position of writing on the disk, the record data which is EFM modulated from the EFM modulation circuit 24 is subsequently output, and the address information showing the address corresponding to the record EFM data which is output is subsequently updated and stored in the memory 26.

The laser driver 28 drives the laser light source with the laser pickup 29 on the basis of the record EFM data output from the EFM modulation circuit 24 so that data is recorded on the disk.

At the time of recording data on the disk, the record clock signal generating circuit 36 generates the record clock signal to control the recording operation of the record data in synchronization with this record clock signal.

By the way, there is generated a state in which the transmission rate of the record data output from the personal computer cannot overtake the writing speed of the record data, so that the data transmission rate of the data input to the EFM modulation circuit 24 becomes slower than the data transmission rate of the data output to the EFM modulation circuit 24. Then the remaining amount of data stored in the buffer circuit 22 decreases.

When this state continues, the remaining amount of the data stored in the buffer circuit 22 soon decreases and an empty state is generated. Then, the buffer remaining amount control circuit 25 judges on the basis of the address information stored in the memory 26 that the state is a state in which the buffer underrun is generated. The fact is notified to the record control circuit 35 with the buffer remaining amount data. When this buffer remaining amount data is received, it is judged that the operation of recording data on the disk is required to be suspended, the phase initialization signal is output to the EFM modulation circuit 24 while the generating operation of the record pulse signal in the record pulse generating circuit 27 is suspended with the recording/suspension signal.

Figure 4:
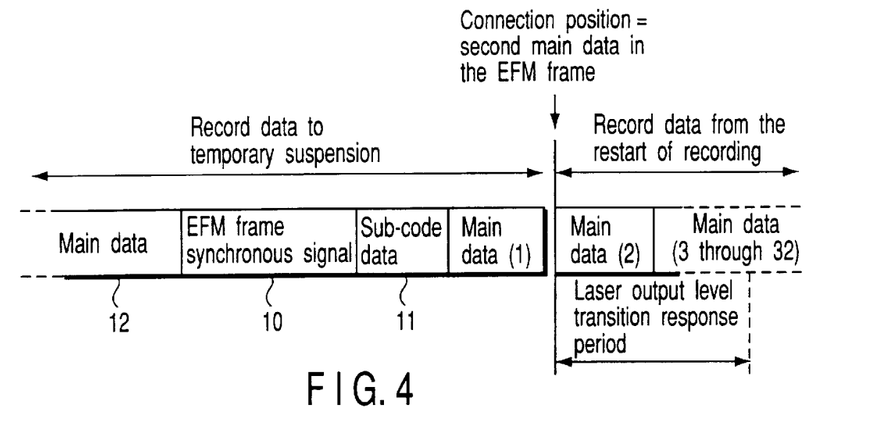
FIG. 4 is a view showing one example of record data at the time of recording data by using an apparatus of FIG. 3.

At this time, as shown in FIG. 4, after the main data of the arbitrary symbol excluding the EFM frame synchronous signal 10 constituting the EFM frame data and the sub-code data 11 is output from the EFM modulation circuit 24, the operation of the EFM modulation circuit 24 and the record pulse generating circuit 27 is controlled so that the output of the record EFM data from the EFM modulation circuit 24 is suspended. Incidentally, in FIG. 4, there is shown a case in which the output of the EFM data from the EFM modulation circuit 24 is suspended after the main data (main data (1)) of the first symbol is constantly output at the time of the temporary suspension of the recording operation.

As a consequence, emission of the writing beam from the laser light source of the laser pickup 29 is suspended, and the recording operation of the data on the disk is suspended.

Here, the output of the record EFM data from the EFM modulation circuit 24 is suspended, the address information corresponding to the address of the final frame of the record EFM data output from the EFM modulation circuit 24 immediately before the suspension is stored in the memory 26 via the buffer remaining amount control circuit 26.

Next, when the next record data is input from the personal computer, the record data recorded on the disk with the access control means (not shown) immediately before the recording operation of the record data is suspended is accessed on the basis of the ATIP demodulated with the ATIP demodulation circuit 33 so that the trace with the laser pickup 29 is started.

In the trace, when the bit signal formed on the disk is simultaneously read with the recording of the record data, and the reproduction EFM data is obtained with the EFM demodulation circuit 31 based on the bit signal, the reproduction clock signal generating circuit 32 generates the reproduction clock signal in synchronization with the reproduction EFM data. Then, in synchronization with the reproduction clock signal, each of the circuits in the area surrounded by the broken line in FIG. 3 is set in the state of being operated, so that the modulation processing by the EFM modulation circuit 24 is conducted in synchronization with the reproduction clock signal.

When the modulation processing by the EFM modulation circuit 24 is conducted in synchronization with the reproduction clock signal, the EFM modulation circuit 24 refers to the address stored in the memory 26 with the result that waiting state is generated for outputting main data (main data (2) in FIG. 4) of the second symbol of the final frame which is recorded on the disk immediately before the suspension of the recording.

When the EFM modulation circuit 24 is set in the waiting state, the address stored in the memory 26 is referred to, so that the front position of the non-recorded area immediately after the recorded area is detected on which the record data is already recorded on the disk with the record starting position detection circuit 34.

The front position of the non-recorded area is detected with the time information of the sub Q data (corresponding to Qi which has been explained before) and information on how many EFM frames are present before the EFM frame at that time information. The data is detected with the judgment on the end of the final frame of the record data on which the data is recorded by retrieving the sub Q data up to the unit of the sub-code blocks (98 sets of EFM frames) and counting the channel bit by referencing to the synchronous signal with respect to the EFM frame unit.

When the front position of the non-recorded area is detected, the clock signal is switched over to a record clock signal generated in the record clock signal generating circuit 36 instead of the reproduction clock signal which is synchronized with the reproduction EFM data from the reproduction clock signal generating circuit 32 as a clock signal, and the record clock signal becomes an operation clock signal of the EFM modulation circuit 24.

When the clock signal is switched over from the reproduction clock signal to the record clock signal, the record EFM data (main data (2)) is simultaneously output from the EFM modulation circuit 24 by the control of the record control circuit 24 with the result that the recording operation with respect to the disk is restarted from the main data (2) in the same EFM frame in which the recording operation is suspended in advance. In this case, the record data which is already recorded on the disk is synchronized with the record EFM data output from the EFM modulation circuit 24. Consequently, as shown in FIG. 4, new record data is recorded in such a manner that the data continues to the end of the final record data recorded on the disk immediately before the recording operation is suspended.

Here, as shown in FIG. 4, the EFM frame synchronous signal 10 in the EFM frame recorded immediately before the recording operation is temporarily suspended is recorded in a definite quality before the temporary suspension.

On the other hand, after the restart of the recording operation, in a period in which the output level of the laser is stabilized from the front of the second symbol of the main data, there is a possibility that the record data cannot be recorded in a definite quality. However, because sufficient time which enables stabilization of the output level of the laser for 30 symbols of the data is given until the EFM frame synchronous signal of the next EFM frame is recorded, the next EFM frame synchronous signal can be recorded in a definite quality.

Figure 5:
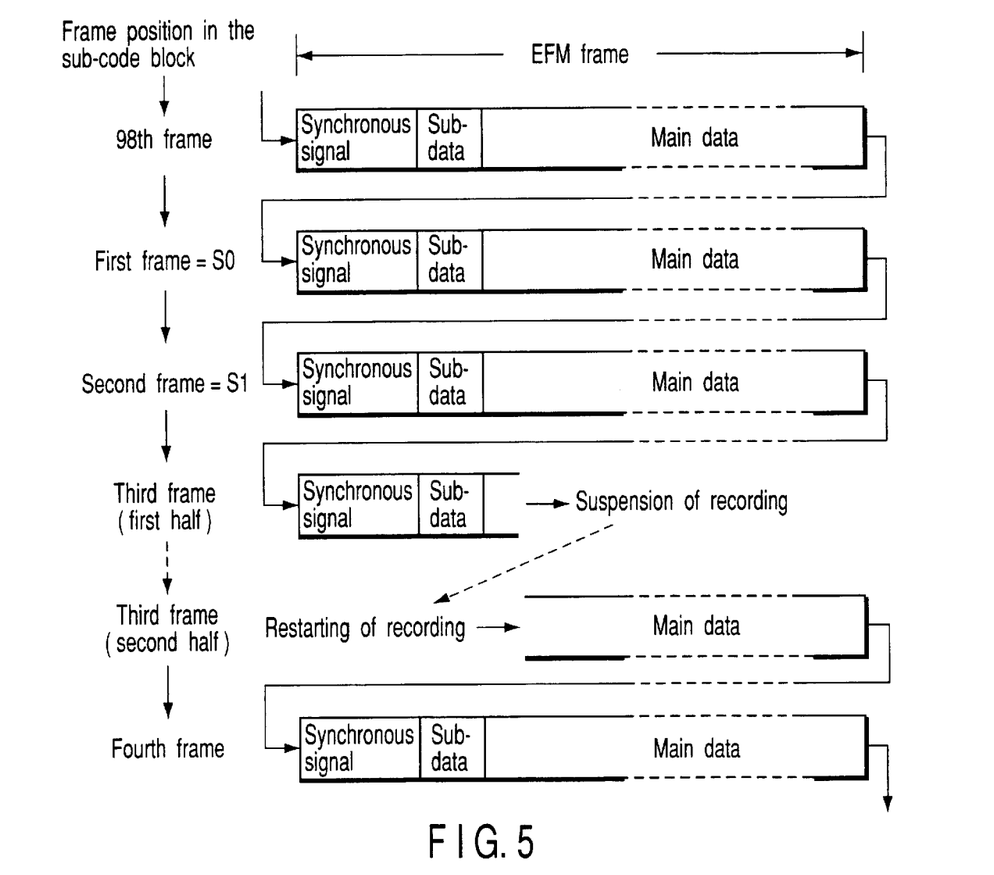
FIG. 5 is a view showing one example of EFM frame data at the time of recording data by using the apparatus of FIG. 3.

Furthermore, at the time when the record data is temporarily suspended and the recording operation is restarted, the record control circuit 35 sets the connection position of the record data at an arbitrary position where the synchronous signals S0 and S1 of the sub-code blocks are avoided to conduct the recording operation. FIG. 5 is a view showing an operation example in the case where the connection position of the sub-code block is fixed to the third sub-code block.

As shown in FIG. 5, the sub-code block synchronous signal (in FIG. 5, the signal is shown as sub-code data) is recorded in a definite quality immediately before the temporary suspension of the recording operation. On the other hand, it is thought the period until the output level of the laser is stabilized from the second symbol of the main data is long, and the period in which the record data cannot be recorded in a definite quality is long, so that the shift in the frame synchronization is generated at the time of the reproduction of the disk. In such a case as well, sufficient time is provided for the re-synchronization to the EFM frame synchronous signal for 96 EFM frames until the next sub-code block synchronization signal is recorded so that the next sub-code block synchronous signal can be stably reproduced.

By the way, in the optical disk recording and reproducing apparatus for recording data in a CD format as shown in FIG. 1, it is thought that the generation and the elimination of the buffer underrun state is judged with the buffer data amount in the EFM unit at the time of suspending and restarting of the record data, and the control of the suspension and the restart of the recording is conducted in the EFM frame unit.

Figure 6:
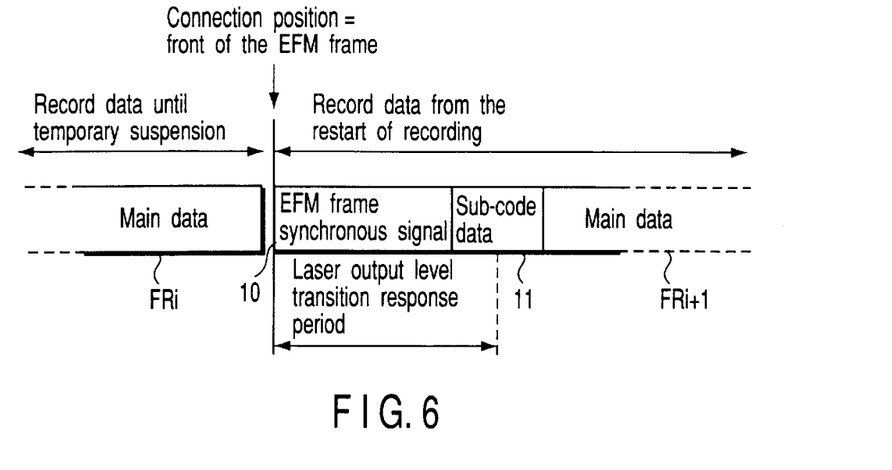
FIG. 6 is a view showing another example of record data at the time of recording data on an optical disk.

That is, when the remaining amount of data in the buffer circuit becomes small and the buffer underrun state is detected, as shown in FIG. 6, the recording operation is temporarily suspended after the EFM frame data FRi in the midst of recording is recorded on the disk. After that, when the remaining amount of DATA in the buffer circuit becomes sufficient, the recording of the EFM frame data is restarted from the next frame FRi+1.

In the optical disk recording and reproducing apparatus, a mechanism for controlling an output level of laser is provided in order to maintain the recording quality on a definite level with the result that a time lag is generated in a period until the laser output level is stabilized immediately after the recording is restarted.

Consequently, as shown in FIG. 6, when the record data is recorded in the EFM frame unit, it becomes impossible to record the synchronous signal (EFM frame synchronous signal 10) of the first EFM frame at which the recording operation is restarted and the sub-code data 11 in a definite quality when the period (laser output level transition response period) immediately after the recording operation is started to the laser output level is stabilized is long.

Figure 7:
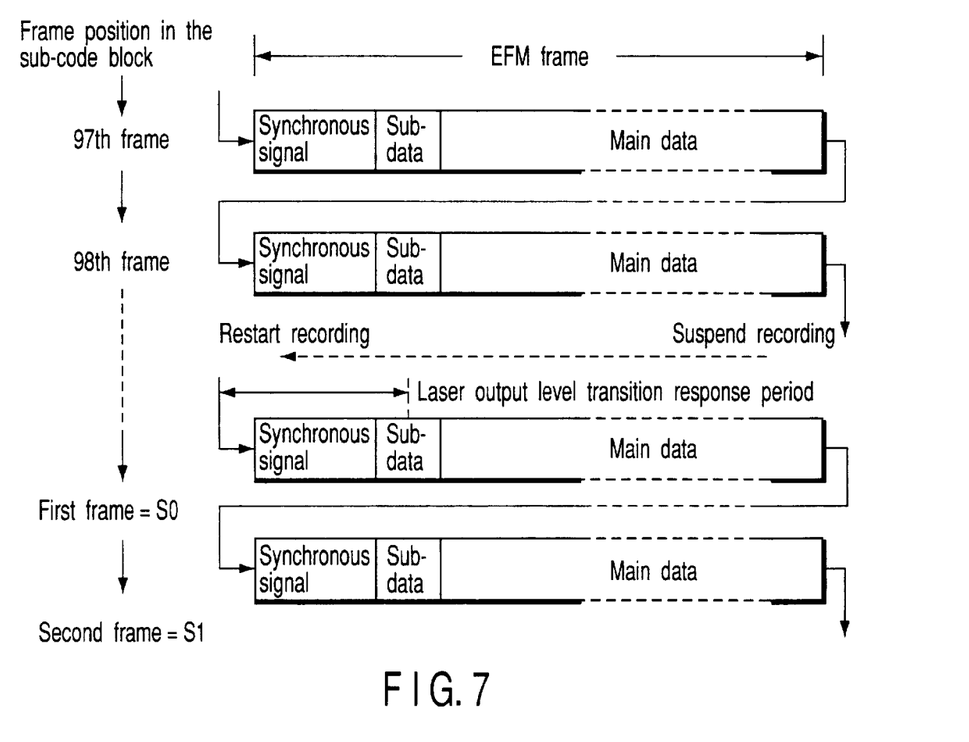
FIG. 7 is a view showing another example of the EFM frame data at the time of recording data on an optical disk.

Furthermore, when the judgment on the buffer underrun state is made in the EFM unit, it becomes indefinite as to how many frames in the sub-code block come before the frame with which the sub-code data is to be connected. As shown in FIG. 7, in the case where the sub-code data is connected with the frame (first or the second frame) including the sub-code block synchronous signals (S0 or S1) (FIG. 7 is a view showing a case in which the code is connected with the first frame including the synchronous signal S0), the sub-code block synchronous signal will not be able to be recorded when the laser output level transition response period continues to the sub-code period (represented as sub-data in FIG. 7).

These synchronous signals, namely, the synchronous signals in the EFM frame synchronous signal and the synchronous signal S0 or S1 in the sub-code block become reference signals in the reproduction of disks, the influence exerted on the disk motor, the control mechanism of the pickup and the data reproduction mechanism at the time of reproduction becomes large as compared with the case in which the recording quality of the record data other than the synchronous signal has been damaged.

However, in the recording apparatus according to the embodiment, when the record data is temporarily suspended and the recording is restarted, the record and control circuit 35 sets the connection position of the record data to an arbitrary position at which the synchronous signals S0 and S1 of the sub-code block are avoided. As a consequence, the EFM frame synchronous signal and the sub-code block synchronous signal can be stably recorded in as stable manner with the result that the disk recording with a high reproduction quality can be realized.

Incidentally, the present invention is not restricted to the above embodiments, and various modifications can be made. For example, in the above embodiment, there is explained a case in which the temporary suspension position of the recording operation with respect to the disk is between the first symbol and the second symbol of the main data. However, in short, any of arbitrary positions of the main data excluding the frame synchronous signal and the sub-code data will do.

A parity region is provided at the end of the EMF frame, or immediately before the EMF frame synchronous signal contained in the next EMF frame. The parity region has a 4-byte parity for correction errors. Even if the recording operation is suspended and started again in the parity region, for example at four bytes before the EMF frame synchronous signal, the laser output level transition response period can fall within the parity region. Hence, the data would not be destroyed. Even if the synchronization of the data is jeopardized when the recording operation is started again, the synchronization can be regained by the use of the synchronous signal. The data can therefore be extracted without fail. It is thereby possible to set the temporary suspension position of the recording operation in the above-mentioned parity region.

Furthermore, in the above embodiment, when the temporary suspension of the record data and the restart of the recording are conducted, the connection position of the record data is fixed to the third sub-code block. However, in short, any position will do as long as the synchronous signals S0 and S1 are avoided, which is note limited to the third sub-code block.

Additional advantages and modifications will readily occur to those skilled in the art. Therefore, the invention in its broader aspects is not limited to the specific details and representative embodiments shown and described herein. Accordingly, various modifications may be made without departing from the sprit or scope of the general inventive concept as defined by the appended clams and their equivalents.

What is claimed is:

1. An optical disk recording and reproducing apparatus comprising:

a buffer circuit configured to receive and store data input via an interface and output the stored data;

an EFM modulation circuit connected to the buffer circuit for receiving data output from the buffer circuit, adding at least a frame synchronous signal and sub-code data with respect to the data, subjecting these items of data to the EFM modulation to create record data to be recorded on an optical disk;

a buffer remaining amount control circuit connected to the interface and the EFM modulation circuit for detecting the remaining amount of data stored in the buffer circuit;

a record control circuit connected to the EFM modulation circuit and the buffer remaining amount control circuit for conducting the control for temporarily suspending the recording operation with respect to the optical disk at an arbitrary position of the main data of the record data excluding the frame synchronous signal and the sub-code data in the case where the detection result of the remaining amount of data in the buffer remaining amount control circuit corresponds to the state in which a data transmission rate of an input data to the buffer circuit is lower than a data transmission rate of an output data from the buffer circuit to the EFM modulation circuit at a time of recording data on the optical disk; and a record restarting position detection circuit connected to the record control circuit for receiving data obtained by reproducing the optical disk on which the recording operation is temporarily suspended in the midst of recording the record data and detecting the position of the disk on which the recording operation is temporarily suspended;

wherein the record control circuit conducts a control for restarting a recording operation with respect to the optical disk from the record restarting position on the disk detected with the record restarting position detection circuit in the case where the detection result of the remaining amount of data in the buffer remaining amount detection circuit corresponds to the state in which the data transmission rate of the input data to the buffer circuit is higher than the data transmission rate of the output data from the buffer circuit to the EFM modulation circuit.

2. The optical disk recording and reproducing apparatus according to claim 1, further comprising a record pulse generating circuit connected to the EFM modulation circuit for creating a record pulse signal in accordance with the record data.

3. The optical disk recording and reproducing apparatus according to claim 1, wherein the buffer remaining amount control circuit compares the address information in the buffer circuit finally input via the interface into the buffer circuit stored and the address information in the buffer circuit of the data finally output from the buffer circuit and input to the EFM modulation circuit to detect the remaining amount of data.

4. The optical disk recording and reproducing apparatus according to claim 2, wherein the record control circuit controls the generating operation of the record pulse signal in the recording pulse signal generating circuit to conduct the temporary suspension control of the recording operation with respect to the optical disk and conducts the control of restarting the recording operation after a temporary suspension.

5. The optical disk recording and reproducing apparatus according to claim 1, wherein the buffer remaining amount control circuit judges the buffer remaining amount in the sub-code block unit; and the record control circuit conducts control for temporarily suspending the recording operation in the frame other than the EFM frame in which a synchronous signal is included in the sub-code when it is judged that the state is generated in which the buffer underrun is generated.

6. The optical disk recording and reproducing apparatus according to claim 1, further comprising a parity addition circuit for creating parity data with respect to data stored in the buffer circuit and adding data stored in the buffer circuit.

7. A method for recording and controlling an optical disk comprising:

storing input data in a buffer circuit and outputting the stored data from the buffer circuit;

adding at least a frame synchronous signal and sub-code data to data output from the buffer circuit and further subjecting data to the EFM modulation to create record data which is to be recorded on an optical disk;

judging the remaining amount of data stored in the buffer circuit for temporarily suspending the recording operation with respect to the optical disk at an arbitrary position of the main data of the record data excluding the frame synchronous signal and the sub-code data in the case where the remaining amount of data provides a state in which a data transmission rate of the input data to the buffer circuit is lower than the output data from the buffer circuit;

detecting the position of the disk on which the recording operation is temporarily suspended by the reproduction of the optical disk in the case where the state in which the data transmission rate of the input data to the buffer circuit is higher than the output data from the buffer circuit; and restarting the recording operation of new record data so that the new data continues to the end of the record data on the optical disk which data is generated in the temporary suspension.

8. The method for recording and controlling an optical disk according to claim 7, wherein the record pulse signal is created in accordance with the record data.

9. The method for recording and controlling the optical disk according to claim 7, wherein an address information of data in the buffer circuit finally input and stored in the buffer circuit is compared with an address information in the buffer circuit of data which is subjected to EFM modulation to judge the remaining amount of data stored in the buffer circuit.

10. The method for recording and controlling an optical disk according to claim 8, wherein an generating operation of the record pulse signal is controlled, the recording operation of data with respect to the optical disk is temporarily suspended and the control for resuming the recording operation after temporary suspension is conducted.

11. The method for recording and controlling the optical disk according to claim 7, wherein the remaining amount of data stored in the buffer circuit is judged with a sub-code block unit, and the recording operation is temporarily suspended in frames other than an EFM frame in which the synchronous signal is included in the sub-code at the time of temporarily suspending the recording operation of recording data on the disk in the state in which the data transmission rate of the input data to the buffer circuit is lower than the data transmission rate of the output data from the buffer circuit.

* * * * *